Dec. 1, 1959 R. G. PIETY 2,915,246

POLYNOMIAL ROOTS COMPUTER

Filed Sept. 19, 1957 2 Sheets-Sheet 1

INVENTOR.
R. G. PIETY

BY Hudson + Young

ATTORNEYS.

Dec. 1, 1959 R. G. PIETY 2,915,246

POLYNOMIAL ROOTS COMPUTER

Filed Sept. 19, 1957 2 Sheets-Sheet 2

INVENTOR.
R. G. PIETY

BY Hudson & Young

ATTORNEYS.

United States Patent Office 2,915,246

Patented Dec. 1, 1959

2,915,246

POLYNOMIAL ROOTS COMPUTER

Raymond G. Piety, Bartlesville, Okla., assignor to Phillips Petroleum Company, a corporation of Delaware Application September 19, 1957, Serial No. 684,928

8 Claims. (Cl. 235—180)

This invention relates to the determination of roots of algebraic polynomials.

This application is a continuation-in-part of my copending application, Serial No. 604,939, filed August 20, 1956, now abandoned.

In various fields of physical measurement and analysis, the data under consideration can advantageously be expressed in the general form of an algebraic polynomial of the type:

$$a_0+a_1^x+a_2x^2+ \dots +a_nx^n$$

where the coefficients $a_0, a_1, a_2, \dots, a_n$ represent sequential values of the data at respective times, space, or the like represented by the $x, x^2, \dots, x^n$, with respect to a reference value associated with the $a_0$ coefficient. In my copending application, Serial No. 553,626, filed December 16, 1955, apparatus is disclosed for expressing data in the form of algebraic polynomials and for performing the basic multiplication and division operations on such polynomials. In accordance with the present invention, a system is provided for obtaining the roots of polynomials. This procedure is important in the analysis of data and in designing automatic analogue control systems.

Accordingly, it is an object of this invention to provide a system which is capable of determining the roots of algebraic polynomials.

The invention can be understood from the following detailed description which is taken in conjunction with the accompanying drawing in which.

The apparatus described in said copending application, Serial No. 553,626, is capable of multiplying one polynomial by another. It has now been discovered that the roots of a polynomial can be obtained by multiplying the polynomial by a signal representing the power series of the reciprocal of one of its factors. Any polynomial with real coefficients can be represented as the product of factors of the first and second degree, the second degree factors having complex conjugate roots. If the reciprocal of a linear factor $(1-ax)$ or quadratic factor $(1-2\,ax\cos b+a^2x^2)$ is expanded by the division algorithm into a power series and the first $n$ terms are employed as a multiplier of a polynomial of the $n$th degree, all coefficients of terms higher than the $(n-1)$th degree are zero for a linear reciprocal, and all terms higher than the $(n-2)$th degree for a quadratic reciprocal are zero. The reciprocal and linear quadratic factors are obtained in accordance with the present invention by use of the fact that the Laplace generating function of $e^{-ct}$ can be expressed $$\frac{1}{1-ax}$$

and the generating function of $e^{-ct}\sin\omega t$ can be expressed $$\frac{ax\sin b}{1-2ax\cos b+a^2x^2}$$

The above relationships are obtained from the fact that the generating functions of the exponential functions and damped sinusoids can be expressed as rational functions. If $$\frac{q(t)=e^{-bt}\text{ for }t>0}{q(t)=0\text{ for }t<0}$$

where $t$ represents time, and if $$e^{-bh}=a$$

where $h$ is an arbitrary sampling interval, defined hereinafter, then $$e^{-bnh}=(e^{-bh})^n=a^n$$

and the generating function of $q(t)$ is $$\sum_{n=0}^{\infty}=a^nx^n=\frac{1}{1-ax}$$

If $$T(t)=e^{-ct}\cos\omega t\text{ for }t\geqq 0$$

and $$T(t)=0\text{ for }t<0$$

then by employing the complex notation and using the relationship above with $$e^{-ch}=a\text{ and }\omega h=b$$

the generating function of $e^{-ct}\cos\omega t$ becomes $$\frac{1-ax\cos b}{1-2\,ax\cos b+a^2x^2}$$

which, if $b=\pi$, becomes $$\frac{1}{1+ax}$$

If $\sin\omega t$ is evaluated as above, the generating function of $e^{-ct}\sin\omega t$ becomes $$\frac{ax\sin b}{1-2\,ax\cos b+a^2x^2}$$

For a detailed discussion of the Laplace generating functions, reference is made to Calculus of Finite Differences, C. Jordan, Chelsea Publishing Co., New York (1947).

Figure 1:
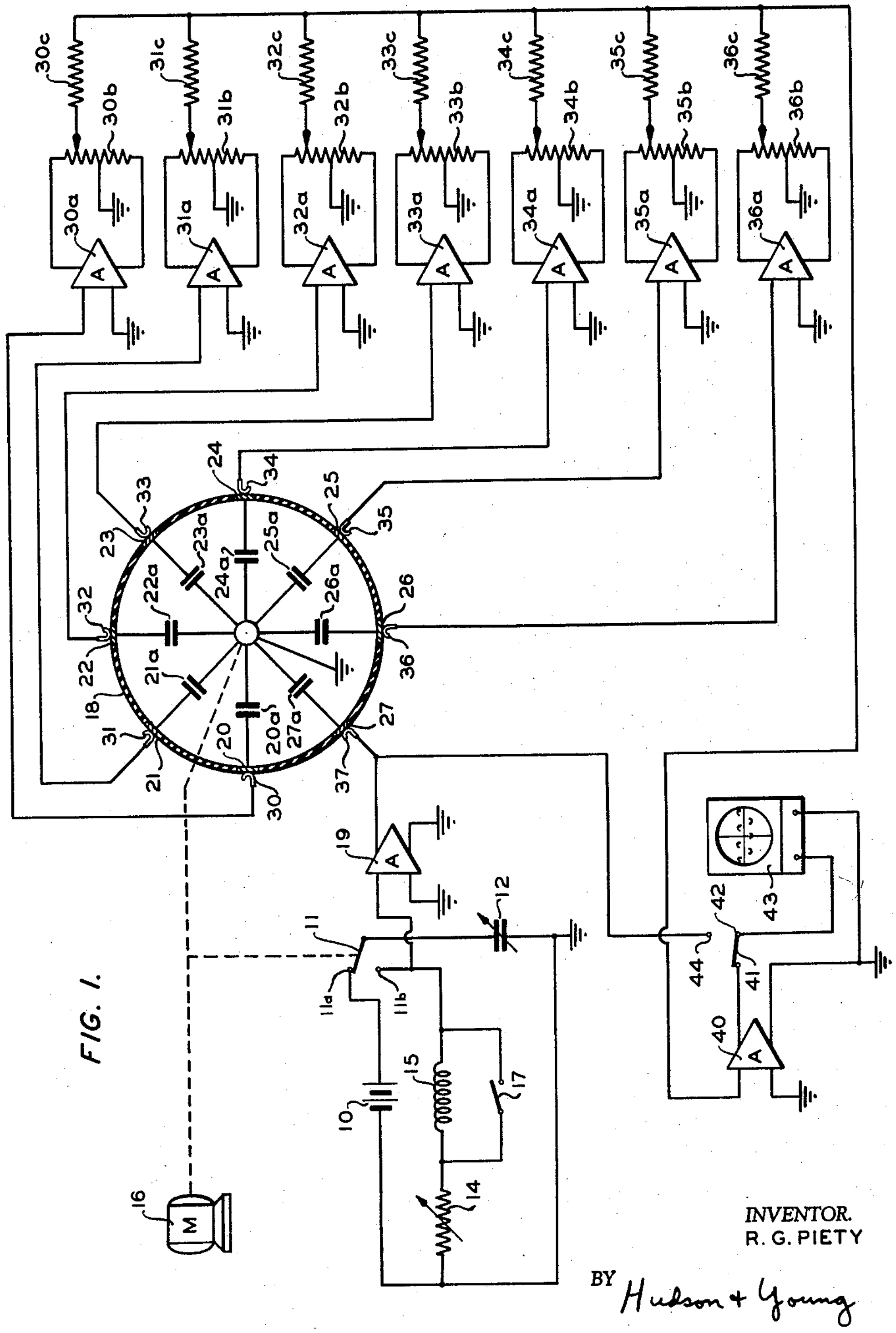
Figure 1 is a schematic circuit drawing of the computing apparatus of this invention.

Apparatus which can be employed to establish electrical signals representative of the above generating functions and to multiply same by a polynomial, the roots of which are to be determined, is illustrated in Figure 1. The positive terminal of a voltage source 10 is connected to a terminal 11*a* which is adapted to be engaged by a switch 11. Switch 11 is connected to the first terminal of a variable capacitor 12, the second terminal of which is connected to ground. The negative terminal of voltage source 10 is connected to ground. A variable resistor 14 and an inductor 15 are connected in series relationship with one another between ground and a terminal 11*b* which is also adapted to be engaged by switch 11. A switch 17 is connected in parallel with inductor 15 to permit the inductor effectively to be eliminated from the circuit. Switch 11 initially engages terminal 11*a*, but is moved into engagement with terminal 11*b* by rotation of a motor 16. This results in a transient signal being generated by the network. When switch 11 engages terminal 11*b*, the voltage decay across capacitor 12 is in the form of a damped sinusoid if switch 17 is opened. If switch 17 is closed, the voltage across capacitor 12 decays exponentially.

Motor 16 also rotates a drum 18 which is formed of electrically insulating material and which has a plurality of conductive segments 20 to 27 spaced about the periphery. Capacitors 20*a* to 27*a* are carried by drum 18 and are connected between respective segments 20 to 27 and a common point of ground potential. A plurality of brushes 30 to 37 are spaced about drum 18 so as to engage respective segments 20 to 27 when drum 18 is in the position illustrated. Terminal 11*b* is connected through D.C. isolation amplifier 19 to brush 37. This prevents charge from being withdrawn from capacitor 12 to capacitors 20*a* to 27*a*. Brushes 30 to 36 are connected to first input terminals of respective D.C. isolation amplifiers 30*a* to 36*a*, the second input terminals of these amplifiers being grounded. Potentiometers 30*b* to 36*b* are connected between the output terminals of respective amplifiers 30*a* to 36*a*. The center taps of potentiometers 30*b* to 36*b* are grounded, and the contactors of these potentiometers are connected through respective isolation resistors 30*c* to 36*c* to the first input terminal of a summing amplifier 40, the second input terminal of amplifier 40 being grounded. The first output terminal of amplifier 40 is connected to a terminal 41 which is adapted to be engaged by a switch 42 that is connected to one input terminal of an oscilloscope 43. The second terminal of oscilloscope 43 and the second output terminal of amplifier 40 are grounded. The first terminal of capacitor 12 is connected to a terminal 44 which is adapted to be engaged by switch 42.

Drum 18 and the circuit associated therewith are adapted to multiply a first polynomial by a second polynomial. For example, it will be assumed that it is desired to multiply a first polynomial of the form $$P(x)=1+\frac{7}{12}x-\frac{1}{3}x^2-\frac{5}{12}x^3+\frac{1}{4}x^4+\frac{7}{48}x^5+\frac{1}{48}x^6$$

by a second polynomial of the form $$Q(x)=1-\frac{1}{2}x+\frac{1}{3}x^2$$

The contactors of potentiometers 30*b* to 36*b* are set in accordance with respective coefficients 1, 7/12, −1/3, −5/12, 1/4, 7/48, and 1/48. For example, potentiometer 30*b* is set so that the voltage at the contactor thereof is representative of the output voltage of amplifier 30*a*. Potentiometer 31*b* is set so that the voltage at the contactor thereof is representative of 7/12 of the output voltage of amplifier 31*a*. The remaining potentiometers are set in a corresponding manner. All of the capacitors 20*a* to 27*a* initially are discharged and drum 18 is rotated in a clockwise direction. An input signal representative of Q($x$) is applied to brush 37 from a suitable signal generator, not shown. This input signal has an amplitude of unity when the drum is in the illustrated position, an amplitude of −1/2 when segment 26 moves into engagement with brush 37, and an amplitude of 1/3 when segment 25 moves into engagement with brush 37. Capacitors 27*a*, 26*a* and 25*a* are thus charged to voltages representative of the coefficients 1, −1/2 and 1/3, respectively.

At the end of one-eighth of a revolution of drum 18, segment 27 is in engagement with brush 30 so that a voltage representative of unity is applied to the input of amplifier 30*a*. The output of amplifier 30*a*, also representative of unity, is thus multiplied by the unity setting of potentiometer 30*b* to form a product of unity. This product is applied to oscilloscope 43. At the end of one-fourth of a revolution of drum 18, segment 27 is in engagement with brush 31 and segment 26 is in engagement with brush 30. The output signal from potentiometer 30*b* is representative of the product of (−1/2)·(1) and the output signal from potentiometer 31*b* is representative of the product (1)·(7/12). The two products are summed by amplifier 40 and applied to oscilloscope 43. It should be evident that as drum 18 continues to rotate, the multiplication and summation process continues in the manner described. The sequential signals applied to oscilloscope 43 are representative of the coefficients of a polynomial that is the product of $P(x)\cdot Q(x)$.

The foregoing multiplication procedure is employed in accordance with the present invention to determine the roots of a polynomial. For example, it will be assumed that the roots are to be determined of a polynomial of the form $$x^6+7x^5+7x^4-35x^3-56^2+28x+48=0$$

Figure 2:
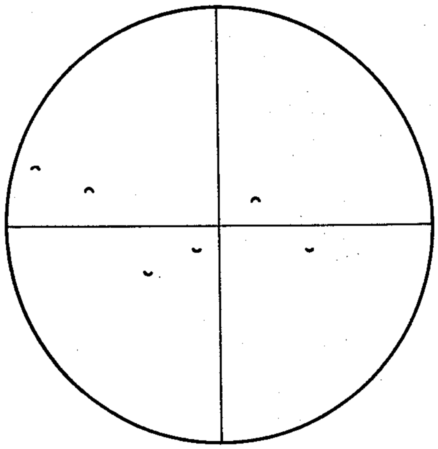
Figures 2, 3, 4 and 5 are graphical representations of operating features of the apparatus of Figure 1.
Figure 3:
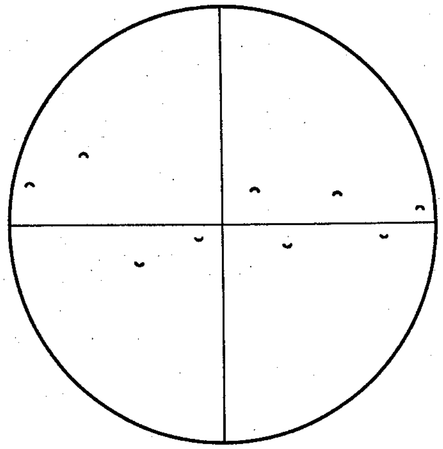

The polynomial can be rewritten as $$\frac{1}{7}+\frac{1}{12}x-\frac{1}{6}x^2-\frac{5}{48}x^3+\frac{1}{48}x^4+\frac{1}{48}x^5+\frac{1}{336}x^6=0$$

which corresponds generally to P($x$), previously described. The coefficients of this polynomial are set on potentiometers 30*b* to 36*b*, as previously described. The real roots, if any, of the polynomial normally are first determined. This is accomplished by applying an input signal to brush 37 of the form $e^{-bt}$, that is, a voltage which decreases in amplitude exponentially. Such a signal can conveniently be established by closing switch 17 of Figure 1 and moving switch 11 into engagement with terminal 11*b* after capacitor 12 has been charged. The resulting voltage across capacitor 12 decreases exponentially. The polynomial P($x$) is thus multiplied by a decreasing voltage of the general form illustrated in Figure 4 where the abscissa represents time and the ordinate represents amplitude. Normally, an output signal is observed on oscilloscope 43 which is of the form shown in Figure 3. There is an infinite number of terms in the product. Resistor 14 and/or capacitor 12 are then adjusted to change the shape of the curve of Figure 4 and the pulsing operation is repeated. If the polynomial has real roots, an input signal to the drum can be found which results in only a finite number of terms in the product, as illustrated in Figure 2. When such an output is observed, a root of the polynomial can be determined.

Figure 4:
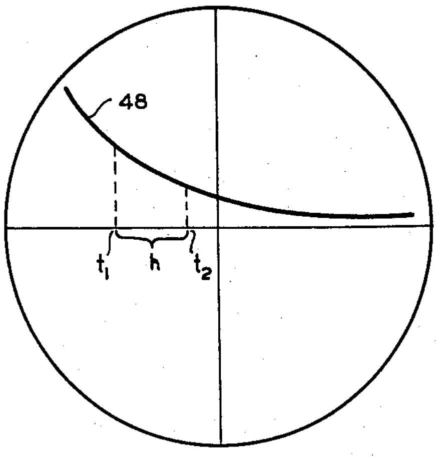

This root is obtained from the configuration of the input signal to brush 37, which signal can be observed on oscilloscope 43 by moving switch 42 into engagement with terminal 44. It is assumed for purposes of description that a signal of the form shown in Figure 4 represents one of the roots. This curve is of the form $e^{-bt}$, where $a$ is the decay in the amplitude of the curve at a time $t_2$ which follows a first time $t_1$ by an interval $h$, $h$ being the time for drum 18 to make one-eighth of a revolution. From an inspection of the curve of Figure 4 it can be seen that $a=\frac{1}{2}$. As previously discussed, $$1-ax=0$$

or $$x=\frac{1}{a}$$

represents a root of the polynomial. This indicates that $x=2$ is a root of the polynomial. In corresponding manner, other input signals can be found which represent the other real roots of the polynomial. If negative roots exist, they can be determined by the same procedure if the polynomial is set on the potentiometers in the reverse manner. Thus coefficients 1/48, 7/48, 1/4, −5/12, −1/3, 7/12 and 1 are set on potentiometers 30*b* to 36*b*, respectively.

Figure 5:
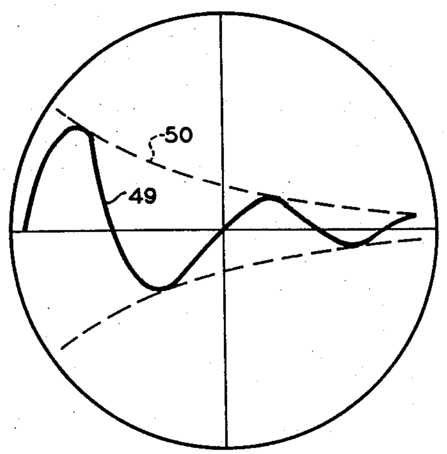

Many polynomials contain complex roots. These roots are obtained by the same general procedure except that a damped sinusoid input signal is required to obtain a product with a finite number of terms. Such a signal can be obtained by the circuit of Figure 1 if switch 17 is open. The amplitude of the resulting signal can be adjusted by varying capacitor 12. It is assumed that an input signal as shown in Figure 5 represents a pair of complex conjugate roots in a given polynomial. The curve of Figure 5 is of the form $$T(t)=e^{-ct}\sin\omega t$$

As previously discussed, the roots can be obtained from the expression $$1-2ax\cos b+a^2x^2=0$$

where $a=e^{-ch}$ and is obtained from the slope of curve 50 of Figure 5 as previously discussed with respect to Figure 4, and $b=\omega h=2\pi fh$. The frequency $f$ of the damped sinusoid can readily be obtained from an inspection of the curve of Figure 5; $h$ represents the time required for drum 18 to complete one-eighth of a revolution, that is, the sampling interval. The roots of $$1-2ax\cos b+a^2x^2=0$$

can readily be obtained from the well known quadratic formula wherein $$x=\frac{2a\cos b\pm\sqrt{(2a\cos b)^2-4a^2}}{2a^2}$$

The mathematical forms of the curves of Figures 4 and 5 can also be determined directly if the values of the circuit components are known. Either such direct computation or a measurement from the oscilloscope, as described, can be used.

It should be evident that the multiplying apparatus illustrated in Figure 1 can readily be expanded to accommodate polynomials having a greater number of coefficients. This merely requires a larger number of capacitors, amplifiers and potentiometers. Also, other configurations of signal storage means can be employed in place of the capacitors, such as magnetic recording mediums and electrical delay lines, for example. Examples of such polynomial multiplying apparatus are described in detail in said application Serial No. 553,626.

While the invention has been described in conjunction with a present preferred embodiment, it should be evident that it is not limited thereto.

What is claimed is:

1. Apparatus for determining the roots of a polynomial comprising means to generate an electrical signal which decreases in amplitude as an exponential function; means to vary the rate of decrease of said signal; a plurality of voltage multiplying means, one for each of the coefficients of the polynomial, said voltage multiplying means being adapted to be set so that input signals applied thereto are multiplied by respective coefficients of the polynomial; a plurality of electrical signal storage means, there being at least one of said storage means for each of said multiplying means; means to apply said electrical signal successively to said storage means so that the first of said storage means receives the first portion of said electrical signal and the remainder of said storage means receive portions of said electrical signal at respective later times; means including voltage isolating means to connect said plurality of storage means successively to said multiplying means; and means to sum the outputs of said multiplying means.

2. The apparatus in accordance with claim 1 wherein said means to generate an electrical signal comprises a capacitor and a resistor connected in series relationship, a voltage source, and means to apply said voltage source across said capacitor and to remove said voltage source from said capacitor, whereby said capacitor discharges through said resistor, the voltage across said capacitor comprising said electrical signal.

3. The apparatus in accordance with claim 2 further comprising an inductor connected in series with said capacitor and said resistor so that said capacitor discharges through said resistor and said inductor.

4. The apparatus in accordance with claim 1 wherein said signal storage means comprise capacitors.

5. The apparatus in accordance with claim 1 further comprising an oscilloscope, and means to connect said oscilloscope selectively to said means to sum and to said means to generate an electrical signal.

6. Apparatus for determining the roots of a polynomial comprising means to generate an electrical signal which decreases in amplitude as an exponential function; means to vary the rate of decrease of said signal; a plurality of voltage multiplying means, one for each of the coefficients of the polynomial, said voltage multiplying means being adapted to be set so that input signals applied thereto are multiplied by respective coefficients of the polynomial; a drum of electrically insulating material; a plurality of capacitors carried by said drum, there being at least one of said capacitors for each of said multiplying means; a plurality of commutator segments on said drum spaced from one another; means connecting first terminals of said capacitors to respective ones of said segments; means connecting the second terminals of said capacitors to a point of reference potential; a plurality of brushes spaced from one another adjacent said drum; means to rotate said drum so that said segments engage said brushes in sequence; means connecting the terminals of said means to generate an electrical signal to one of said brushes and to said point of reference potential, respectively; means including voltage isolating means to connect said brushes other than said one brush to respective ones of said multiplying means; and means to sum the outputs of said multiplying means.

7. The apparatus in accordance with claim 6 wherein said means to generate an electrical signal comprises a capacitor and a resistor connected in series relationship, a voltage source, and means to apply said voltage source across said capacitor and to remove said voltage source from said capacitor, whereby said capacitor discharges through said resistor, the voltage across said capacitor comprising said electrical signal.

8. The apparatus in accordance with claim 7 further comprising an inductor connected in series with said capacitor and said resistor so that said capacitor discharges through said resistor and said inductor.

References Cited in the file of this patent

UNITED STATES PATENTS 2,643,821 Frager ---------------- June 30, 1953

OTHER REFERENCES

Cyclone Symposium II on Simulation and Computing Techniques, part 2 (Miller), 1952, page 186.

A Pulse Operated Auto Correlator (Stoneman), December 1952.